United States Patent [19]

Takahashi et al.

[11] Patent Number: 4,894,548
[45] Date of Patent: Jan. 16, 1990

[54] RADIATION IMAGE RECORDING AND REPRODUCING METHOD AND RADIATION IMAGE STORAGE PANEL EMPLOYED FOR THE SAME

[75] Inventors: Kenji Takahashi; Takashi Nakamura; Yuichi Hosoi, all of Kaisei, Japan

[73] Assignee: Fuji Photo Film Co., Ltd., Minami, Japan

[21] Appl. No.: 147,572

[22] Filed: Jan. 19, 1988

Related U.S. Application Data

[63] Continuation of Ser. No. 47,596, May 19, 1987, abandoned, which is a continuation of Ser. No. 723,873, Apr. 16, 1905, abandoned.

[30] Foreign Application Priority Data

Apr. 17, 1984 [JP] Japan .................................. 59-77226

[51] Int. Cl.$^4$ .............................................. C09K 11/61
[52] U.S. Cl. ............................... 250/484.1; 250/327.2; 252/301.4 H; 428/691
[58] Field of Search .............. 252/301.4 H; 250/484.1, 250/327.2; 428/691

[56] References Cited

U.S. PATENT DOCUMENTS 3,163,608 12/1964 Yocom .................... 252/301.4 H X
3,447,097 5/1969 Kiss ......................... 252/301.4 H X
4,368,390 1/1983 Takahashi et al. ................ 250/484.1
4,512,911 4/1985 Koteva et al. ............... 252/301.4 H

FOREIGN PATENT DOCUMENTS 29963 6/1981 European Pat. Off. ..... 252/301.4 H
2642226 3/1978 Fed. Rep. of Germany ... 252/301.4 H
21430970 8/1980 France .

Primary Examiner—Jack Cooper
Attorney, Agent, or Firm—Sixbey, Friedman, Leedom and Ferguson

[57] ABSTRACT

A radiation image recording and reproducing method comprising steps of:
(i) causing a divalent europium activated complex halide phosphor having the formula (I):

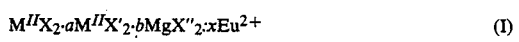

$$M^{II}X_2 \cdot aM^{II}X'_2 \cdot bMgX''_2 : xEu^{2+} \qquad (I)$$

in which $M^{II}$ is at least one alkaline earth metal selected from the group consisting of Ba, Sr and Ca; each of X and X' is at least one halogen selected from the group consisting of Cl, Br and I, and $X \neq X'$; X" is at least one halogen selected from the group consisting of F, Cl, Br and I; and a, B and x are numbers satisfying the conditions of $0.1 \leq a \leq 10.0$, $2 \times 10^{-5} \leq b \leq 2 \times 10^{-2}$ and $0 < x \leq 0.2$, respectively, to absorb a radiation having passed through an object or having radiated form an object;
(ii) exposing said stimulable phosphor to an electromagnetic wave having a wavelength within the range of 450–1000 nm to release the radiation energy stored therein as light emission; and
(iii) detecting the emitted light. A radiation image storage panel employed for said method is also disclosed.

16 Claims, 2 Drawing Sheets

RADIATION IMAGE RECORDING AND REPRODUCING METHOD AND RADIATION IMAGE STORAGE PANEL EMPLOYED FOR THE SAME

This application is a continuation of Ser. No. 047,596, filed 5/11/87, now abandoned, which itself is a continuation of Ser. No. 723,873, filed 4/16/85, now abandoned.

BACKGROUND OF THE INVENTION

1. Field of the Invention

The present invention relates to a radiation image recording and reproducing method and a radiation image storage panel employed for the same. More particularly, the invention relates to a radiation image recording and reproducing method using a divalent europium activated complex halide stimulable phosphor and a radiation image storage panel employed for the same.

2. Description of the Prior Art

For obtaining a radiation image, there has been conventionally employed a radiography utilizing a combination of a radiogrraphic film having an emulsion layer containing a sensitive silver salt material and an intensifying screen. As a method replacing the above-mentioned conventional radiography, a radiation image recording and reproducing method utilizing a stimulable phosphor as described, for instance, in U.S. Pat. No. 4,239,968, has been paid much attention. The method involves steps of causing a stimulable phosphor to absorb a radiation having passed through an object or having radiated from an object; sequentially exciting (or scanning) the phosphor with an electromagnetic wave such as visible light or infrared rays (stimulating rays) to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at a considerably smaller dose, as compared with the conventional radiography. Accordingly, the radiation image recording and reproducing method is of great value, especially when the method is used for medical diagnosis.

There is proposed a divalent europium activated alkaline earth metal fluorohalide phosphor ($M^{II}FX:Eu^{2+}$, in which $M^{II}$ is at least one alkaline earth metal selected from the group consisting of Ba, Sr and Ca; and X is a halogen other than fluorine), as a stimulable phosphor employable in the radiation image recording reproducing method. The phosphor gives emission (stimulated emission) in the near ultraviolet region when excited with an electromagnetic wave such as visible light or infrared rays after absorption of a radiation such as X-rays.

As for a stimulable phosphor employable in the radiation image recording and reproducing method, almost no stimulable phosphor other than the divalent europium activated alkaline earth metal fluorohalide phosphor is known.

The present applicant discovered a novel divalent europium activated alkaline earth metal halide phosphor having the formula:

$$M^{II}X_2.aM^{II}X'_2:xEu^{2+}$$

in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leq a \leq 10.0$ and $0 < x \leq 0.2$, respectively, and applied for a patent with respect to said phosphor, a radiation image recording and reproducing method utilizing said phosphor and a radiation image storage panel employing said phosphor (U.S. patent application No. 660,987 and European Patent Application No. 84112417.5).

The novel divalent europium activated alkaline earth metal halide phosphor has been confirmed to have a crystal structure different from that of the aforementioned $M^{II}FX:Eu^{2+}$ phosphor on the basis of the X-ray diffraction patterns as described in the above application. This phosphor gives stimulated emission (peak wavelength: approx 405 nm) in the near ultraviolet to blue region when excited with an electromagnetic wave having a wavelength within the region of 450–1000 nm after exposure to a radiation such as X-rays, ultraviolet rays and cathode rays.

The radiation image recording and reproducing method using a radiation image storage panel which comprises the above-mentioned stimulable phosphor is very useful for obtaining a visible image as described above, and in this method, the sensitivity thereof is desired to be as high as possible. The sensitivity of the radiation image storage panel to a radiation generally increases as the luminance of stimulated emission of the phosphor employed for the panel increases. Accodingly, the stimulable phosphor employed for the panel is desired to show the luminance of stimulated emission as high as possible.

SUMMARY OF THE INVENTION

The present invention provides a radiation image recording and reproducing method and a radiation image storage panel employed for the same which are improved in the sensitivity.

The present inventors have studied on the above-described novel divalent europium activated alkaline earth metal halide phosphor, and found that the phosphor obtained by incorporating a specific amount of magnesium halide thereinto shows stimulated emission of high luminance.

The radiation image recording and reproducing method of the present invention comprises steps of:

(i) causing a divalent europium activated complex halide phosphor having the formula (I):

$$M^{II}X_2.aM^{II}X'_2.bMgX''_2:xEu^{2+} \qquad (I)$$

in which $M^{II}$ is at least one alkaline earth metal selected from the group consisting of Ba, Sr and Ca; each of X and X' is at least one halogen selected from the group consisting of Cl, Br and I, and $X \neq X'$; X'' is at least one halogen selected from the group consisting of F, Cl, Br and I; and a, b and x are numbers satisfying the conditions of $0.1 \leq a \leq 10.0$, $2 \times 10^{-5} \leq b \leq 2 \times 10^{-2}$ and $0 < x \leq 0.2$, respectively, to absorb a radiation having passed through an object or having radiated from an object;

(ii) exposing said stimulable phosphor to an electromagnetic wave having a wavelength within the range of 450–1000 nm to release the radiation energy stored therein as light emission; and (iii) detecting the emitted light.

The radiation image storage panel of the invention comprises a support and a stimulable phosphor layer provided thereon, in which said stimulable phosphor layer contains the divalent europium activated complex halide phosphor having the above formfula (I).

The present invention is accomplished on the basis of the finding that the luminance of stimulated emission of the above-mentioned novel divalent europium activated alkaline earth metal halide phosphor, which is given under excitation with an electromagnetic wave having a wavelength within the region of 450–1000 nm after exposure to a radiation such as X-rays, is extremely enhanced by incorporating a specific amount of magnesium halide thereinto.

Accordingly, the sensitivity of the radiation image recording and reproducing method can be enhanced by using the divalent europium activated complex halide phosphor having the formula (I). The radiation image storage panel of the invention comprising said phosphor has the highly enhanced sensitivity.

DETAILED DESCRIPTION OF THE INVENTION

The phosphor employed in the present invention is a divalent europium activated complex halide phosphor having the formula (I):

$$M^{II}X_2\cdot aM^{II}X'_2\cdot bMgX''_2:xEu^{2+} \quad (I)$$

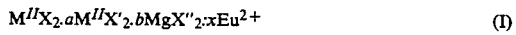

in which $M^{II}$ is at least one alkaline earth metal selected from the group consisting of Ba, Sr and Ca; each of X and X' is at least one halogen selected from the group consisting of Cl, Br and I, and X≠X'; X" is at least one halogen selected from the group consisting of F, Cl, Br and I; and a, b and x are numbers satisfying the conditions of $0.1 \leq a \leq 10.0$, $2 \times 10^{-5} \leq b \leq 2 \times 10^{-2}$ and $0 < x \leq 0.2$, respectively.

In the phosphor having the formula (I), magnesium halide ($MgX''_2$) is preferably $MgF_2$ and the number for b indicating the amount of $MgX''_2$ is preferably within the range of $4 \times 10^{-5} \leq b \leq 10^{-2}$, from the viewpoint of enhancement in the luminance of stimulated emission. From the same viewpoint, the number of a in the formula (I) which indicates the ratio between $M^{II}X_2$ and $M^{II}X'_2$ is preferably within the range of $0.3 \leq a \leq 3.3$ and more preferably of $0.5 \leq a \leq 2.0$, and the number for x indicating the amount of europium activator is preferably within the range of $10^{-5} \leq x \leq 10^{-1}$.

Figure 1:
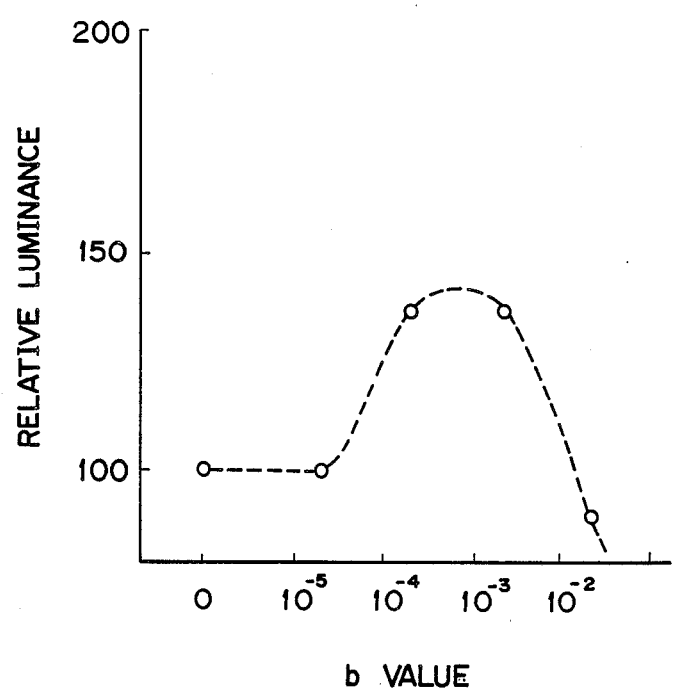
FIG. 1 shows a relationship between b value and luminance of stimulated emission with respect to $BaCl_2\cdot BaBr_2\cdot bMgF_2:0.001Eu^{2+}$ phosphor which is an example of the divalent europium activated complex halide phosphor employed in the invention.

An example of the phosphor having the formula (I), $BaCl_2\cdot BaBr_2\cdot bMgF_2:0.001Eu^{2+}$ phosphor, has a relationship between b value indicating the amount of magnesium fluoride and luminance of stimulated emission as shown in FIG. 1.

FIG. 1 graphically shows a relationship between b value and luminance of stimulated emission [emission luminance upon excitation with a semiconductor laser beam (wavelength: 780 nm) after exposure to X-rays at 80 KVp] with respect to $BaCl_2\cdot BaBr_2\cdot bMgF_2:0.001Eu^{2+}$ phosphor. As is evident from FIG. 1, the $BaCl_2\cdot BaBr_2\cdot bMgF_2:0.001Eu^{2+}$ phosphor having b value within the range of $2 \times 10^{-5} \leq b \leq 2 \times 10^{-2}$ gives stimulated emission of higher luminance than the phosphor containing no magnesium fluoride (b=0). On the basis of this fact, the b value range of the divalent europium activated complex halide phosphor employed in the invention, namely $2 \times 10^{-5} \leq b \leq 2 \times 10^{-2}$, has been decided. As is also evident from FIG. 1, the phosphor having b value within the range of $4 \times 10^{-5} \leq b \leq 10^{-2}$ gives stimulated emission of extremely high luminance.

It has been confirmed that the divalent europium activated complex halide phosphors employed in the present invention having $M^{II}$, X, X', X" and a other than the above-stated ones have the same tendencies in the relationships between b value and the luminance of stimulated emission as shown in FIG. 1.

Further, the divalent europium activated complex halide phosphor may contain other various additives so far as the effect given by incorporating $MgX_2$ (that is, enhancement in the luminance of stimulated emission) is not reduced. Examples of the additive include potassium halide ($KX'''$, in which $X'''$ is at least one halogen selected from the group consisting of F, Cl, Br and I) and a trivalent metal halide ($M^{III}X'''_3$, in which $M^{III}$ is at least one trivalent metal selected from the group consisting of Sc, Y, La, Gd and Lu; and $X'''$ has the same meaning as defined above). The amount of $KX'''$ is preferably in the range of $2 \times 10^{-3}$–1.6 mols per 1 mol of $M^{II}X_2\cdot aM^{II}X'_2$ and the amount of $M^{III}X'''_3$ is preferably in the range of $4 \times 10^{-4}$–0.2 mol per 1 mol.

The stimulation spectrum of the divalent europium activated complex halide phosphor having the above formula (I) is almost the same as that of the divalent europium activated alkaline earth metal halide phosphor described in the aforementioned U.S. patent application No. 660,987. In the radiation image recording and reproducing method employing said phosphor, it is possible to vary the wavelength of stimulating rays for exciting the phosphor because of the wide wavelength region of its stimulation spectrum, namely 450–1000 nm. It means that a source of stimulating rays can be suitably selected according to the purpose. For example, a semiconductor laser (having a wavelength in the infrared region) which is in a small size and needs only weak driving power can be employed as the source of stimulating rays, and accordingly the system for carrying out the method can be made compact. From the viewpoint of the emission luminance and of the separation on wavelength between the emitted light and stimulating rays, the stimulating rays are preferred to be an electromagnetic wave having a wavelength within the range of 500–850 nm.

The divalent europium activated complex halide phosphor having the above formula (I) can be prepared, for instance, by a process described below.

As starting materials, the following materials can be employed:

(1) at least one alkaline earth metal selected from the group consisting of barium halide, calcium halide and strontium halide;

(2) magnesium halide; and (3) at least one compound selected from the group consisting of europium compounds such as europium halide, europium oxide, europium nitrate and europium sulfate.

Further, ammonium halide may be employed as a flux.

In the process for the preparation of the phosphor, the alkaline earth metal halide (1), magnesium halide (2) and europium compound (3) are, in the first place, mixed in the stoichiometric ratio corresponding to the formula (II):

$$M^{II}X_2 \cdot aM^{II}X'_2 \cdot bMgX''_2 : xEu \qquad (II)$$

in which $M^{II}$, X, X', X'', a, b and x have the same meanings as defined hereinbfore.

The mixing procedure is conducted, for instance, by mixing the starting materials in the form of an aqueous solution. From the aqueous solution of the starting materials, water is removed to obtain a dry mixture in a solid form. The removal of water is preferably conducted at room temperature or not so high temperature (for instance, not higher than 200° C.) by drying under reduced pressure and/or vacuum. The mixing procedure is by no means restricted to this one.

The magnesium halide (2) may be added to the dry mixture obtained by mixing and drying the other starting materials.

Then, the resulting dry mixture of starting materials is placed in a heat-resistant container such as a quartz boat, an alumina crucible or a quartz crucible, and fired in an electric furnace. The temperature for firing suitably ranges from 500 to 1300° C. The firing period is determined depending upon the amount of the mixture, the firing temperature, etc., and suitably ranges from 0.5 to 6 hours. As the firing atmosphere, there can be employed a weak reducing atmosphere such as a nitrogen gas atmosphere containing a small amount of hydrogen gas or a carbon dioxide gas atmosphere containing carbon monoxide gas. A trivalent europium compound is generally employed as the starting material (3) and in the firing stage, the trivalent europium contained in the mixture is reduced into divalent europium by the weak reducing atmosphere.

After firing the mixture of starting materials for the phosphor, the fired product is taken out of the funace, allowed to stand for cooling and pulverized. The pulverized product may be further fired (second firing). The second firing is conducted at a temperature of 500°-800° C. for 0.5-12 hours in an inert atmosphere such as a nitrogen gas atmosphere or an argon gas atmosphere, or in the above-mentioned weak reducing atmosphere.

Through the firing procedure, a phosphor employed in the present invention is produced. The phosphor thus obtained may be processed in a conventional manner involving a variety of procedures for the preparation of phosphors such as a washing procedure, a drying procedure and a sieving procedure.

In the case that the phosphor contains the aforementioned additives, the additives are incorporated into the aqueous solution in the mixing procedure or into the dry mixture prior to the firing stage.

The above-described process gives the divalent euorpium activated complex halide phosphor having the above formula (I).

The divalent europium activated complex halide phosphor having the formula (I) is preferably employed in the form of a radiation image storage panel (also referred to as a stimulable phosphor sheet) in the radiation image recording and reproducing method of the invention.

The radiation image storage panel comprises a support and at least one phosphor layer provided on one surface of the support. The phosphor layer comprises a binder and a stimulable phosphor dispersed therein. Further, a transparent protective film is generally provided on the free surface of the phosphor layer (surface not facing the support) to keep the phosphor layer from chemical deterioration or physical shock.

In other words, the radiation image recording and reproducing method of the invention is desirably carried out by employing the radiation image storage panel having a phosphor layer which comprises the divalent europium activated complex halide phosphor having the formula (I).

In the method employing the stimulable phosphor having the formula (I) in the form of a panel, a radiation having passed through an object or radiated from an object is absorbed by the phosphor layer of the panel to form a radiation image of the object as a radiation energy-stored image on the panel. The panel is then irradiated (e.g., scanned) with an electromagnetic wave (stimulating rays) in the wavelength region of 450–1000 nm to release the stored image as stimulated emission. The emitted light is photoelectrically detected to obtain electric signals so that the radiation image of the object can be reproduced as a visible image from the electric signals.

The radiation image recording and reproducing method of the present invention will be described more in detail with respect to an example of a radiation image storage panel containing the stimulable phosphor having the formula (I), by referring to a schematic view shown in FIG. 2.

Figure 2:
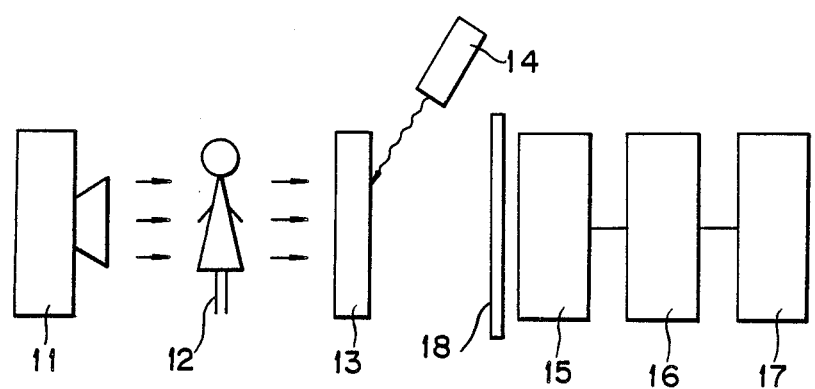
FIG. 2 is a schematic view showing the radiation image recording and reproducing method according to the invention.

In FIG. 2 which shows the total system of the radiation image recording and reproducing method of the invention, a radiation generating device 11 such as an X-ray source provides a radiation for irradiating an object 12 therewith; a radiation image storage panel 3 containing the stimulable phosphor having the formula (I) absorbs and stores the radiation having passed through the object 12; a source of stimulating rays 14 provides an electromagnetic wave for releasing the radiation energy stored in the panel 13 as light emission; a photosensor 15 such as a photomultiplier faces the panel 13 for detecting the light emitted by the panel 13 and converting it to electric signals; an image reproducing device 16 is connected with the photosensor 15 to reproduce a radiation image from the electric signals detected by the photosensor 15; a display device 17 is connected with the reproducing device 16 to display the reproduced image in the form of a visible image on a CRT or the like; and a filter 18 is disposed in front of the photosensor 15 to cut off the stimulating rays reflected by the panel 13 and allow only the light emitted by the panel 13 to pass through.

FIG. 2 illustrates an example of the system according to the method of the invention employed for obtaining a radiation-transmission image of an object. However, in the case that the object 12 itself emits a radiation, it is unnecessary to install the above-mentioned radiation generating device 11. Further, the photosensor 15 to the display device 17 in the system can be replaced with other appropriate devices which can reproduce a radiation image having the information of the object 12 from the light emitted by the panel 13.

Referring to FIG. 2, when the object 12 is exposed to a radiation such as X-rays provided by the radiation generating device 11, the radiation passes through the object 12 in proportion to the radiation transmittance of each portion of the object. The radiation having passed through the object 12 impinges upon the radiation image storage panel 13, and is absorbed by the phosphor layer of the panel 13. Thus, a radiation energy-stored image (a kind of latent image) corresponding to the radiation-transmission image of the object 12 is formed on the panel 13.

Thereafter, when the radiation image storage panel 13 is irradiated with an electromagnetic wave having the wavelength within the range of 450–1000 nm, which is provided by the source of stimulating rays 14, the radiation energy-stored image formed on the panel 13 is released as light emission. The luminance of so released light is in proportion to the luminance of the radiation energy which has been absorbed by the phosphor layer of the panel 13. The light signals corresponding to the luminance of the emitted light are converted to electric signals by means of the photosensor 15, the electric signals are reproduced as an image in the image reproducing device 16, and the reproduced image is displayed on the display device 17.

The detection of the radiation image stored in the panel 13 can be, for example, performed by scanning the panel with the electromagnetic wave such as a laser beam provided by the source of stimulating rays 14 and detecting the light emitted from the panel 13 under scanning by means of the photosensor 15 such as photomultiplier to sequentially obtain electric signals.

In the radiation image recording and reproducing method of the present invention, there is no specific limitation on the radiation employable for exposure of an object to obtain a radiation transmittance image thereof, as far as the above-described phosphor gives stimulated emission upon excitation with the electromagnetic wave after exposure to the radiation. Examples of the radiation employable in the invention include those generally known, such as X-rays, cathode rays and ultraviolet rays. Likewise, there is no specific limitation on the radiation radiating from an object for obtaining a radiation image thereof, as far as the radiation can be absorbed by the above-described phosphor to serve as an energy source for producing the stimulated emission. Examples of the radiation include γ-rays, α-rays and β-rays.

As the source of stimulating rays for exciting the phosphor which has been absorbed the radiation having passed through or radiated from the object, there can be employed, for instance, light sources providing light having a band spectrum distribution in the wavelength region of 450–1000 nm; and light sources providing light having a single wavelength or more in said region such as an Ar ion laser, a Kr ion laser, a He-Ne laser, a ruby laser, a semiconductor laser, a glass laser, a YAG laser, a dye laser and a light emitting diode (LED). Among the above-mentioned sources of stimulating rays, the lasers are preferred because the radiation image storage panel is exposed thereto with a high energy density per unit area. Particularly preferred are a He-Ne laser, Ar ion laser and Kr ion laser. The semiconductor laser is also preferred, because its size is small, it can be driven by a weak electric power and its output power can be easily stabilized because of the direct modulation thereof.

The radiation image storage panel employable in the radiation image recording and reproducing method of the invention will be described.

The radiation image storage panel, as described hereinbefore, comprises a support and a stimulable phosphor layer provided thereon which comprises a binder and the above-described divalent europium activated complex halide phosphor having the formula (I) dispersed therein.

The stimulable phosphor layer can be formed on a support, for instance, by the following procedure.

Examples of the binder to be employed in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copoymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose of polyalkyl (meth)acrylate.

In the first place, the stimulable phosphor particles and a binder are added to an appropriate solvent, and then they are mixed to prepare a coating dispersion of the phosphor particles in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the phosphor in the coating dispersion may be determined according to the characteristics of the aimed radiation image storage panel and the nature of the phosphor employed. Generally, the ratio therebetween is within the range of from 1:1 to 1:100 (binder: phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of a support to form a layer of the coating dispersion. The coating procedure can be carried out by a conventional method such as a method using a doctor blade, a roll coater or a knife coater.

A support material employed in the present invention can be selected from those employed in the conventional radiogaphic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storge panel, while the latter is appropriate for preparing a high-sensitive type radiation image storage panel.

In the preparation of a known radiation image storage panel, one or more additional layers are occasionally provided between the support and the phosphor layer, so as to enhance the adhesion between the support and the phosphor layer, or to improve the sensitivity of the panel or the quality of an image provided thereby. For instance, a subbing layer or an adhesive layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided.

As described in U.S. patent application No. 496,278 (the whole content of which is described in European Patent Publication No. 92241), the phosphor layer-side surface of the support (or the surface of an adhesive layer, a light-reflecting layer, or light-absorbing layer in the case that such layers are provided on the phosphor layer) may be provided with protruded and depressed portions for enhancement of the sharpness of radiation image.

After applying the coating dispersion to the support as descrived above, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 $\mu$m to 1 mm, preferably from 50 to 500 $\mu$m.

The phosphor layer can be provided on the support by the methods other than that given in the above. For instance, the phosphor layer is initially prepared on a sheet (false support) such as a glass plate, metal plate or plastic sheet using the aforementioned coating dispersion and then thus prepared phosphor layer is overlaid on the genuine support by pressing or using an adhesive agent.

The phosphor layer placed on the support can be in the form of a single layer or in the form of plural (two or more) layers. When the plural phosphor layrers are placed, at least one layer contains the aforementioned divalent europium activated complex halide phosphor having the formula (I), and the plural layers may be placed in such a manner that a layer nearer to the surface shows stimulated emission of higher luminance. In any case, that is, in either the single phosphor layer or plural phosphor layers, a variety of known stimulable phosphors are employable in combination with the above-mentioned stimulable phosphor.

Examples of the stimulable phosphor employable in combination with the stimulable phosphor of the invention include the aforementioned phosphor and the phosphors described below;

ZnS:Cu,Pb, $BaO \cdot xAl_2O_3$:Eu, in which x is a number satisfying the condition of $0.8 \leq x \leq 10$, and $M^{II}O \cdot xSiO_2$:A, in which $M^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

$(Ba_{1-x-y},Mg_x,Ca_y)FX:aEu^{2+}$, in which X is at least one element selected from the group consisting of Cl and Br, x and y are numbers satisfying the conditions of $0 < x+y \leq 0.6$, and $xy \neq 0$, and a is a number satisfying the condition of $10^{-6} \leq a \leq 5 \times 10^{-2}$, as described in Japanese Patent Provisional Publication No. 55(1980)-12143; and LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078.

A radiation image storage panel generally has a transparent film on a free surface of a phosphor layer to physically and chemically protect the phosphor layer. In the panel of the present invention, it is preferable to provide a transparent film for the same purpose.

The transparent film can be provided on the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided on the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 0.1 to 20 $\mu$m.

The present invention will be illustrated by the following examples, but these examples by no means restrict the invention.

EXAMPLE 1

To 800 ml of distilled water ($H_2O$) were added 333.2 g. of barium bromide ($BaBr_2 \cdot 2H_2O$), 244.3 g. of barium chloride ($BaCl_2 \cdot 2H_2O$), 0.125 g. of magnesium fluoride ($MgF_2$) and 0.783 g. of europium bromide ($EuBr_3$), and they were mixed to obtain an aqueous solution. The aqueous solution was dried at 60° C. under reduced pressure for 3 hours and further dried at 150° C. under vacuum for another 3 hours to obtain a mixture of the starting materials for the preparation of a phosphor.

The mixture thus obtained was placed in an alumina crucible, which was, in turn, placed in a high-temperature electric furnace. The mixture was then fired at 900° C. for 1.5 hours under a carbon dioxide atmosphere containing carbon monoxide. After the firing was complete, the crucible was taken out of the furnace and allowed to stand for cooling. Thus, a divalent europium activated complex halide phosphor ($BaCl_2 \cdot BaBr_2 \cdot 2 \times 10^{-3} MgF_2 : 0.001 Eu^{2+}$) was obtained.

Further, the amount of magnesium fluoride was varied within the range of 0–2.0 moles per 1 mol of $BaCl_2 \cdot BaBr_2$ to obtain a variety of divalent europium activated complex halide phosphors having a different amount of magnesium fluoride ($BaCl_2 \cdot BaBr_2 \cdot bMgF_2 : 0.001 Eu^{2+}$).

The phosphors obtained in Example 1 were excited with a semeconductor laser beam (wavelength: 780 nm) after exposure to X-rays at 80 KVp, to measure the luminance of stimulated emission. The results are shown in FIG. 1.

FIG. 1 graphically shows a relationship between an amount of magnesium fluoride (b value) and luminance of stimulated emission.

As is evident from FIG. 1, the $BaCl_2 \cdot BaBr_2 \cdot bMgF_2 : 0.001 Eu^{2+}$ phosphor having b value within the range of $2 \times 10^{-5} \leq b \leq 2 \times 10^{-2}$ was enhanced in the luminance of stimulated emission. Particularly, the phosphor having b value within the range of $4 \times 10^{-5} \leq b \leq 10^{-2}$ showed the stimulated emission of high luminance.

EXAMPLE 2

To a mixture of the powdery divalent europium activated complex halide phosphor ($BaCl_2 \cdot BaBr_2 \cdot 2 \times 10^{-3} MgF_2 : 0.001 Eu^{2+}$) obtained in Example 1 and a linear polyester resin were added successively methyl ethyl ketone and nitrocellulose (nitrification degree: 11.5%), to prepare a dispersion containing the phosphor and the binder (10:1, by weight). Subsequently, tricresyl phosphate, n-butanol and methyl ethyl ketone were added to the dispersion. The mixture was sufficiently stirred by means of a propeller agitater to obtain a homogeneous coating dispersion having a viscosity of 25–35 PS (at 25° C.).

The coating dispersion was applied to a polyethylene terephthalate sheet containing titanium dioxide (support, thickness: 250 μm) placed horizontally on a glass plate. The application of the coating dispersion was carried out using a doctor blade. The support having a layer of the coating dispersion was then placed in an oven and heated at a temperature gradually rising from 25° to 100° C. Thus, a phosphor layer having a thickness of 250 μm was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiation image storage panel consisting essentially of a support, a phosphor layer and a transparent protective film was prepared.

EXAMPLE 3

The procedure of Example 1 was repeated except for using 0.407 g. of magnesium chloride ($MgCl_2 \cdot 6H_2O$) instead of magnesium fluoride, to obtain a powdery divalent europium activated complex halide phosphor ($BaCl_2 \cdot BaBr_2 \cdot 2 \times 10^{-3} MgCl_2 : 0.001 Eu^{2+}$).

Subsequently, the procedure of Example 2 was repeated except for employing the obtained phosphor, to prepare a radiation image storage panel consisting essentially of a support, phosphor layer and a transparent protective film.

COMPARISON EXAMPLE 1

The procedure of Example 1 was repeated except for adding no magnesium fluoride, to obtain a divalent europium activated barium chlorobromide phosphor ($BaCl_2 \cdot BaBr_2 : 0.001 Eu^{2+}$).

Subsequently, the procedure of Example 2 was repeated except for employing the obtained phosphor, to prepare a radiation image storage panel consisting essentially of a support, a phosphor layer and a transparent protective film.

The radiation image storage panels prepared in Examples 2 and 3 and Comparison Example 1 were measured on the sensitivity (i.e., luminance of stimulated emission) when excited with a semiconductor laser beam (wavelength: 780 nm) after exposure to X-rays at 80 KVp.

The results on the evaluation of the panels are set forth in Table 1.

TABLE 1

| | Additive Component | Relative Sensitivity |
|---|---|---|
| Example 2 | $MgF_2$ | 140 |
| Example 3 | $MgCl_2$ | 110 |
| Com. Example 1 | none | 100 |

We claim:

1. A radiation image recording and reproducing method comprising steps of:
   (i) causing a divalent europium activated complex halide phosphor having the formula (I):

$$M^{II}X_2 \cdot aM^{II}X'_2 \cdot bMgX''_2 : xEu^{2+} \qquad (I)$$

in which $M^{II}$ is at least one alkaline earth metal selected from the group consisting of Ba, Sr and Ca; each of X and X' is at least one halogen selected from the group consisting of Cl, Br and I, and $X \neq X'$; X'' is at least one halogen selected from the group consisting of F, Cl, Br and I; and a, b and x are numbers satisfying the conditions of $0.1 \leq a \leq 10.0$, $2 \times 10^{-5} \leq b \leq 2 \times 10^{-2}$ and $0 < x \leq 0.2$, respectively, to absorb a radiation having passes through an object or having radiated from an object;
   (ii) exposing said stimulable phosphor to an electromagnetic wave having a wavelength within the range of 450–1000 nm to release the radiation energy stored therein as light emission; and
   (iii) detecting the emitted light.

2. The radiation image recording and reproducing method as claimed in claim 1, in which a in the formula (I) is a number satisfying the condition of $0.3 \leq a \leq 3.3$.

3. The radiation image recording and reproducing method as claimed in claim 1, in which b in the formula (I) is a number satisfying the condition of $4 \times 10^{-5} \leq b \leq 10^{-2}$.

4. The radiation image recording and reproducing method as claimed in claim 1, in which $M^{II}$ in the formula (I) is Ba.

5. The radiation image recording and reproducing method as claimed in claim 1, in which each of X and X' in the formula (I) is Cl or Br.

6. The radiation image recording and reproducing method as claimed in claim 1, in which X" in the formula (I) is F.

7. The radiation image recording and reproducing method as claimed in claim 1, in which x in the formula (I) is a number satisfying the condition of $10^{-5} \leq x \leq 10^{-1}$.

8. The radiation image recording and reproducing method as claimed in claim 1, in which said electromagnetic wave is one having a wavelength within the range of 500–850 nm.

9. The radiation image recording and reproducing method as claimed in claim 1, in which said electromagnetic wave is a laser beam.

10. A radiation image storage panel comprising a support and a stimulable phosphor layer provided thereon, in which said stimulable phosphor layer contains a divalent europium activated complex halide phosphor having the formula (I):

$$M^{II}X_2 \cdot aM^{II}X'_2 \cdot bMgX''_2 : xEu^{2+} \qquad (I)$$

in which $M^{II}$ is at least one alkaline earth metal selected from the group consisting of Ba, Sr and Ca; each of X and X' is at least one halogen selected from the group consisting of Cl, Br and I, and X≠X'; X" is at least one halogen selected from the group consisting of F, Cl, Br and I; and a, b and x are numbers satisfying the conditions of $0.1 \leq a \leq 10.0$, $2 \times 10^{-5} \leq b \leq 2 \times 10^{-2}$ and $0 < x \leq 0.2$, respectively.

11. The radiation image storage panel as claimed in claim 10, in which a in the formula (I) is a number satisfying the condition of $0.3 \leq a \leq 3.3$.

12. The radiation image storage panel as claimed in claim 10, in which b in the formula (I) is a number satisfying the condition of $4 \times 10^{-5} \leq b \leq 10^{-2}$.

13. The radiation image storage panel as claimed in claim 10, in which $M^{II}$ in the formula (I) is Ba.

14. The radiation image storage panel as claimed in claim 10, in which each of X and X' in the formula (I) is Cl or Br.

15. The radiation image storage panel as claimed in claim 10, in which X" in the formula (I) is F.

16. The radiation image storage panel as claimed in claim 10, in which x in the formula (I) is a number satisfying the condition of $10^{-5} \leq x \leq 10^{-1}$.

* * * * *